(No Model.)
S. B. RICKERSON.
ROLLER MILL.
No. 271,518. Patented Jan. 30, 1883.
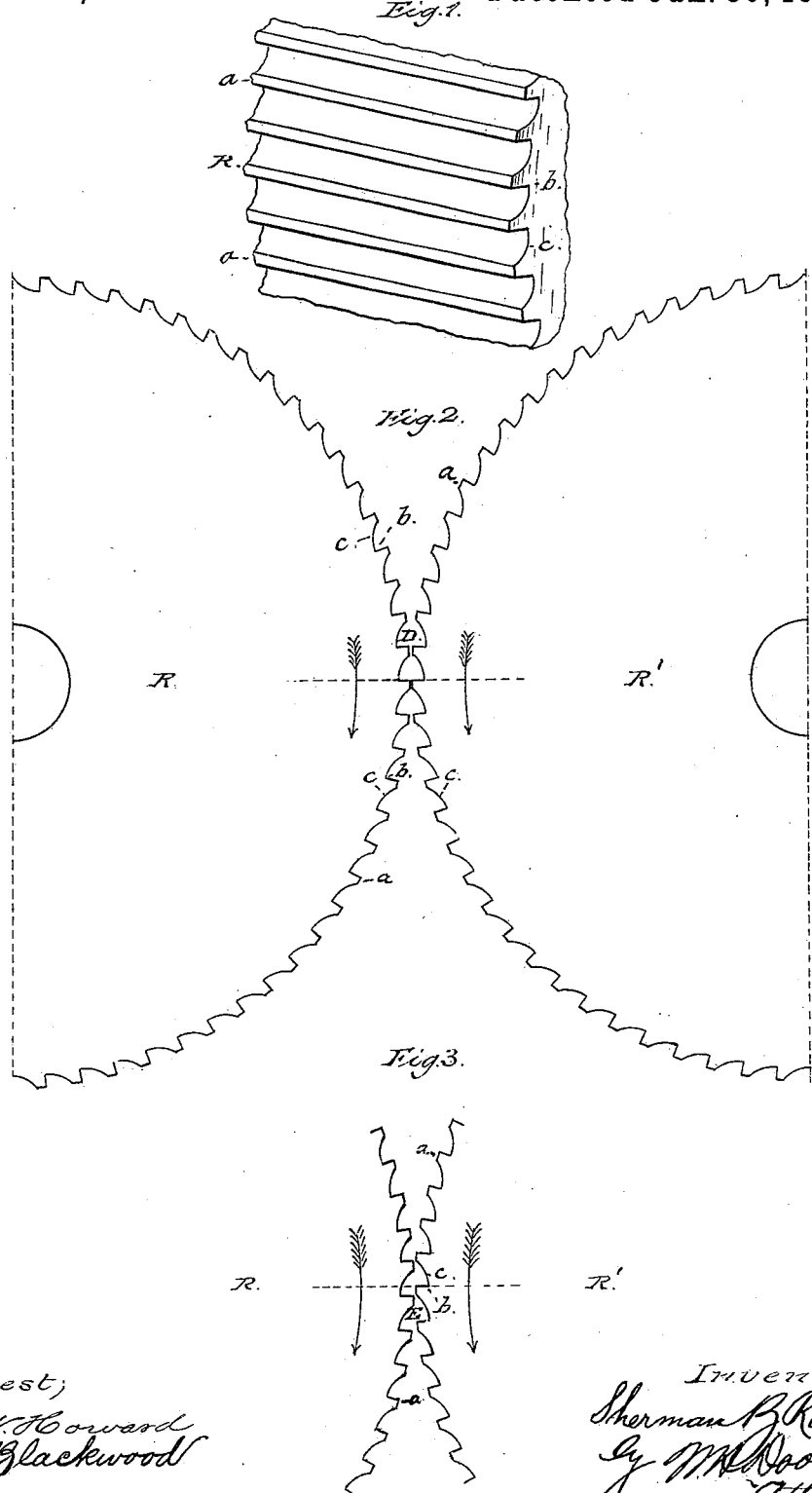
Attest:
F. W. Howard
W. B. Blackwood
Inventor;
Sherman B. Rickerson
By M. Doolittle
Attorney

United States Patent Office.

SHERMAN B. RICKERSON, OF COOPERSVILLE, ASSIGNOR TO THE O. E. BROWN MANUFACTURING COMPANY, OF GRAND RAPIDS, MICHIGAN.

ROLLER-MILL.

SPECIFICATION forming part of Letters Patent No. 271,518, dated January 30, 1883.

Application filed November 10, 1882. (No model.)

*To all whom it may concern:*

Be it known that I, SHERMAN B. RICKERSON, of the village of Coopersville, in the township of Polkton, county of Ottawa, and State of Michigan, have invented certain new and useful Improvements in Roller-Mills for Grinding and Reducing Wheat and other Grain, of which the following is a specification.

My invention relates to that class of roller-mills in which two rolls or cylinders are placed side by side, having spiral grooves, and revolving or turning toward each other, one roll having a slower motion than the other; and the objects of my invention are to produce a more perfect granulation of the grain by removing at the first break the crease-dirt and the germ with the least amount of friction, producing well-sized and large middlings, so that the impurities may be more easily separated therefrom, and to prevent the subsequent pulverizing or regrinding of the impurities and middlings together in the same break by receiving the whole at once after being thus broken into suitably-formed pockets.

My improvement consists of a roller having a special form of dress, as shown in the accompanying drawings, and hereinafter described.

Figure 1 is a section of the face of one of the rolls, illustrating the form of the ribs and grooves constituting the dress. Fig. 2 illustrates the form of pockets formed by said ribs and grooves when the rolls are moving in the same direction and at the same speed; and Fig. 3 illustrates the form of pockets and the relative position of the ribs and grooves when in use, as I propose to employ them, and when they are moving at different speeds.

Similar letters refer to similar parts throughout the several views.

In the drawings, R R' represent a pair of rolls supported by any suitable means. The ribs of the rolls have plain wide outer faces, $a$, one straight vertical side, $b$, and an opposite concave side, $c$. These parts on the face of the rolls form pockets, such as D, shown in Fig. 2, and E in Fig. 3. When a dress is thus formed with a rib having a cutting-edge on one side narrower than the outer face, it has what is known among millers as a "feather-edge."

I am aware that a form of dress in which the outer face of the rib is plain, with one side concave and the opposite side beveled, is old, as shown and described in the Odell Patents Nos. 250,954 and 260,226; but my form of dress differs in that one of its sides is straight, making a different-shaped pocket; and it differs, also, in its mode of operation and in the results produced.

It is essential to the perfect granulation of grain by this system that the greatest amount possible of crease-dirt be separated from the grain at the first step, and that their subsequent mixing and pulverization be prevented. To this end I construct the dress so that each kernel of grain shall be subjected to just sufficient friction to split it when the rolls are operated, liberating the dirt without grinding it, leaving the crushed grain or middlings of good and even size; and at the moment the grain is thus split and broken it, together with the impurities, drops immediately into pockets of sufficient depth to prevent further grinding of these materials together. To this end, also, I drive one roll, R, slower than the other, R', by means of differential pulleys or other gearing, and arrange the dress so that when thus driven the feather-edge or upper part of the concave of the fast-roll rib moves forward first and strikes the heel (the point where the straight vertical side of the rib meets the top surface) of the opposite rib on the slow roll. At this point the grain falling between the ribs in the direction shown by the arrows is caught and broken and immediately dropped into the pockets without being ground or pulverized.

In the patents referred to the beveled sides of the ribs are called the granulating sides, and in crushing the grain one beveled side of the rib first meets the beveled edge of the opposite rib at a point parallel therewith, instead of, as in my case, having the concave edge first strike the feather-edge of the opposite rib, thus subjecting the grain and dirt to a longer grinding and reducing their particles to a smaller size than by my improvement.

I have found by many actual tests that by my form of dress and manner of operating the rolls a far less per cent. of crease-dirt is mingled and ground with the middlings, and consequently a much superior quality of flour produced, than by any other form of rolls with which I am acquainted. After the grain passes through one set of rolls it is passed through the scalping reel or bolt, and then through successive rolls, the speed of which may be increased, if desired, at each successive grinding, until the final grade of flour is reached.

Having thus described my invention, what I claim, and desire to secure by Letters Patent, is—

1. In a roller-mill, the described roll provided with ribs and grooves, each rib having a plain outer surface, one straight vertical side, and an opposite concave side, substantially as described.

2. The combination of the rolls adapted to be revolved at different speeds, and each provided with a dress composed of grooves and ribs, each of the latter having a plain outer surface, one straight vertical side, and an opposite concave side arranged and operated as described, so that the concave edge of the fast-roll rib will first strike the heel of the slow-roll rib, as and for the purposes set forth.

SHERMAN B. RICKERSON.

Witnesses:
EDWARD TAGGART,
R. W. POWERS.